United States Patent [19]

Barlage et al.

[11] Patent Number: 4,889,190
[45] Date of Patent: Dec. 26, 1989

[54] SOIL WORKING MACHINE

[75] Inventors: Bruno Barlage; Franz-Josef Robert, both of Hörstel, Fed. Rep. of Germany

[73] Assignee: H. Niemeyer Söhne GmbH & Co. KG, Hörstel, Fed. Rep. of Germany

[21] Appl. No.: 217,499

[22] Filed: Jul. 11, 1988

[30] Foreign Application Priority Data

Sep. 18, 1987 [EP] European Pat. Off. ............ 87113665

[51] Int. Cl.$^4$ ..................... A01B 21/06; A01B 61/00; F16D 7/04
[52] U.S. Cl. .................................... 172/49.5; 464/38; 172/103
[58] Field of Search ................ 172/103, 49.5, 59, 111; 464/38, 39, 42–44; 192/56 R

[56] References Cited

U.S. PATENT DOCUMENTS

| 2,560,427 | 7/1951 | Foss | 464/38 |
| 2,643,530 | 6/1953 | Lathrop | 464/39 |
| 3,379,034 | 4/1968 | Gustafson | 464/38 |
| 4,153,115 | 5/1979 | van der Lely | 172/49.5 |
| 4,183,231 | 1/1980 | van der Lely | 172/49.5 |
| 4,800,826 | 1/1989 | Shiskin | 111/1 |

FOREIGN PATENT DOCUMENTS 242413 11/1925 United Kingdom .................. 464/38
939364 10/1963 United Kingdom ................ 172/103

OTHER PUBLICATIONS

Copending application number 07/110,716.

Primary Examiner—Richard J. Johnson
Attorney, Agent, or Firm—Jordan and Hamburg

[57] ABSTRACT

The soil working machine, especially a circular spike harrow, includes a support housing (2) which extends perpendicular to the running direction (1), several soil working tools (3) disposed next to one another at the support housing (2), tool supports (4) asociated with each of the soil working tools (3), a driveshaft (6) connected to the tool support (4) and rotatably mounted in the support housing (2), and a rotational drive for the tool supports (4). The rotational drive has a gear wheel transmission (10) disposed in the support housing (2), the gear wheel transmission (10) having one gear wheel (11) for each tool support (4), the gear wheel (11) being rotatably mounted on a hub body (12) which is affixed on the drivehsaft (6) in a non-rotating fashion. The gear wheel (11) is coupled to the hub body (12) by a catching device (14, 25) which is under a spring pretension and which can be temporarily released in case of overload. The catching device (14, 25) includes an overrunning clutch through which the hub body (12) can be rotated relative to the gear wheel (11) within a given clearance angle (15).

16 Claims, 2 Drawing Sheets

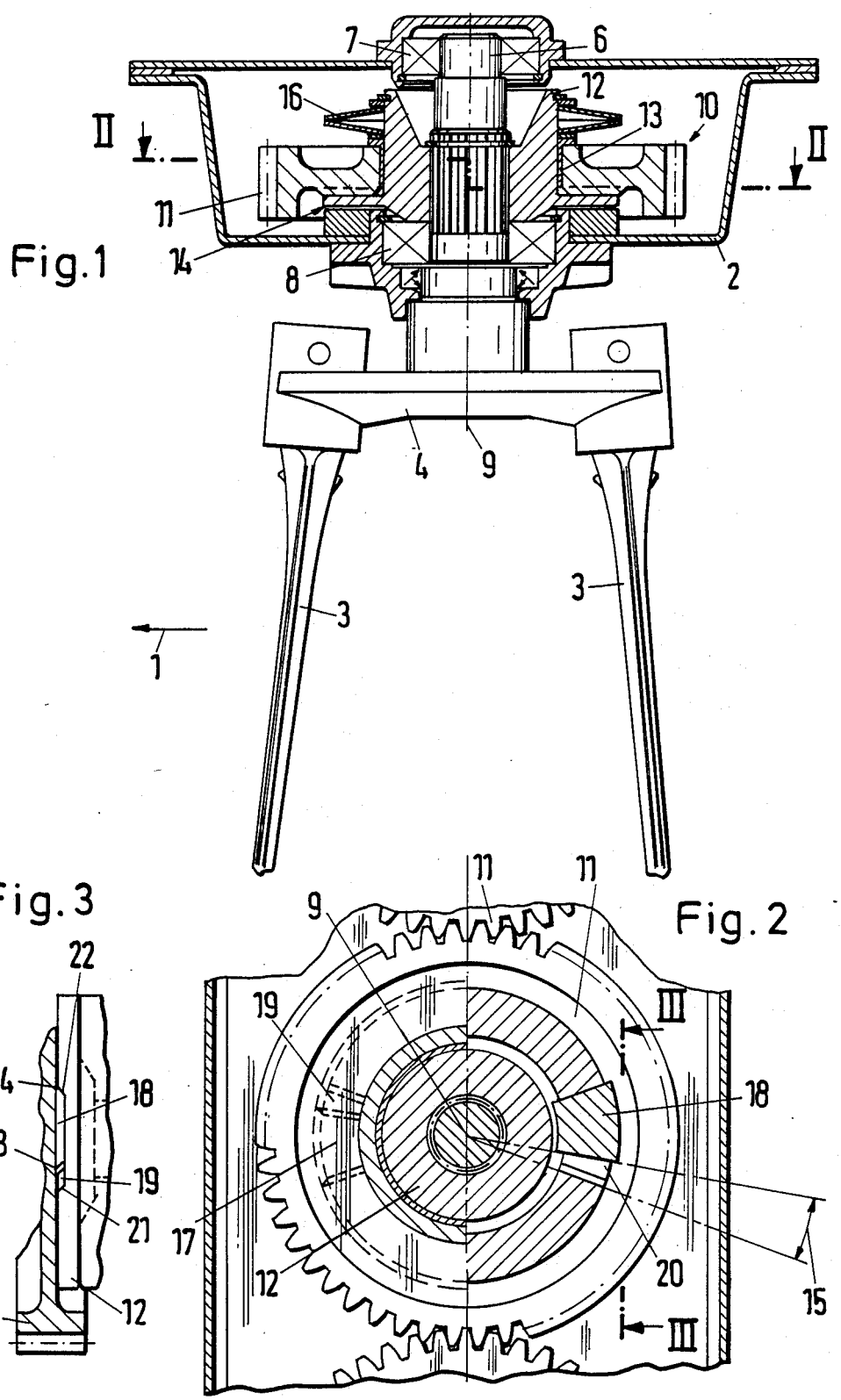

SOIL WORKING MACHINE

The invention relates to a soil working machine having overload protection.

In a known soil working machine of the type disclosed in DE-A-25 29 175, the catching devices form overload protectors which individually and independently protect each soil working tool. The hub body has blind holes which are situated diametrically opposite one another and which run radially relative to the driveshaft of the tool support. Each of these hoes houses a pressure spring which back grips a catch ball that is provided as a catching element. In its catch position, this catch ball protrudes from the blind hole and engages a recess in the inside ring area of the toothed wheel so as to lock it. If an overload occurs, e.g. when the soil working tool encounters a stone, the catch balls move out of their recesses and release the hub body for an escaping pivoting motion of the driveshaft of the soil working tool. After traversing a pivoting angle of 180°, the catch balls again catch in their recesses, thus re-establishing the coupling between the toothed wheel and the hub body.

In stony soils with frequent responses of the overload protection, correspondingly frequent interruptions occur in the course of soil processing due to the temporary work stoppage of the soil working tool. In addition, considerable wear is associated with the release and catching processes.

It is an object of the invention to provide a soil working machine of the type mentioned in the introduction which will not reduce the protective effect of the catching devices on the soil working tools associated with them but will decrease the response frequency of these devices.

The over-running clutch in the catching devices makes it possible for the soil working tools for example, the spike wheel in a circular spike harrow, to execute a limited rotating motion. In many cases when stresses occur from collision with stones, this is sufficient to allow the stones to pass and to avoid an interruption of the drive.

Further details appear in the following description and drawing in which two embodiments of the object of the invention are clarified in more detail.

BRIEF DESCRIPTION OF THE DRAWINGS

FIG. 1 shows a first embodiment of a soil working machine of the invention and is a vertical section through the axis of rotation of a soil working tool.

FIG. 2 is a sectional view taken along the line II—II in FIG. 1.

FIG. 3 is a sectional view taken along the line III—III in FIG. 2.

DESCRIPTION OF THE PREFERRED EMBODIMENTS

Figure 4:
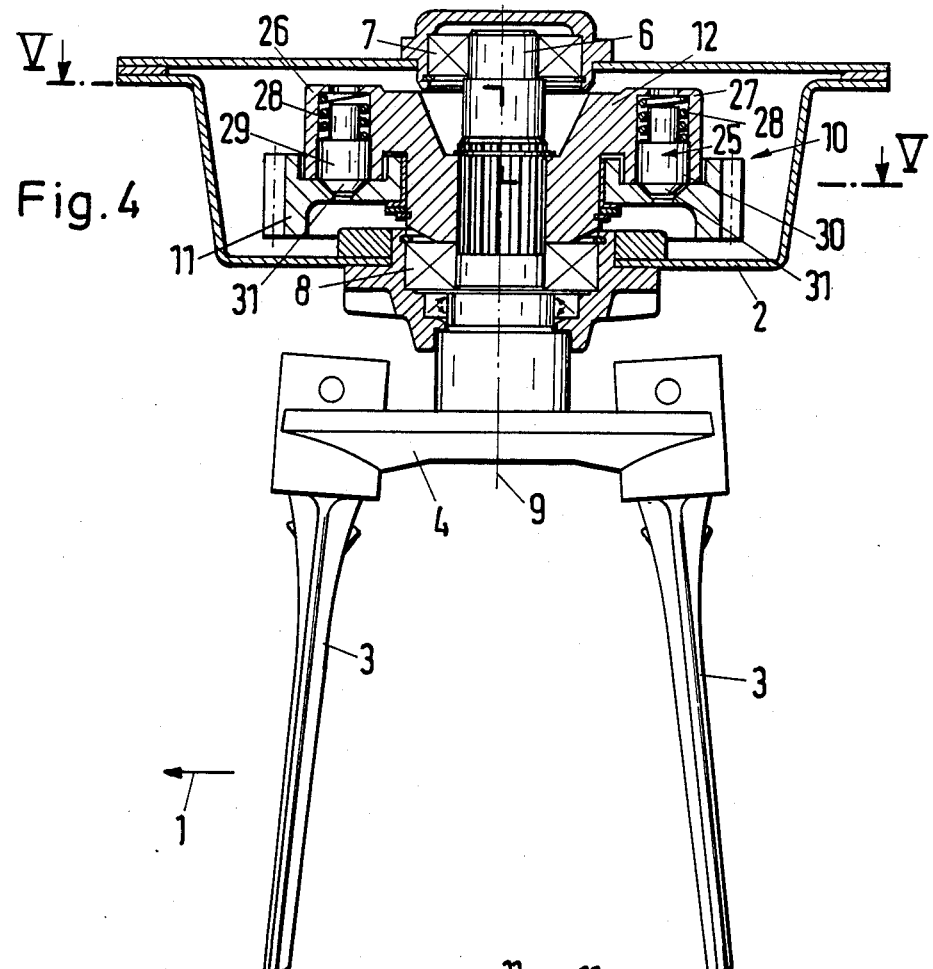
FIG. 4 is a view similar to FIG. 1 showing a second embodiment of a soil working machine of the invention.

The drawings show a soil working machine with a circular spike harrow and is a preferred embodiment of the invention. However, any other design with rotationally driven soil working tools, which need an overload protection while they are operating, for example, a circular hoe, also comes into consideration as a soil working machine.

The soil working machine shown here comprises a support housing 2, in the form of a hollow beam, running perpendicular to the direction of motion of the machine in its operation, as shown by arrow 1, and several soil working tools disposed next to one another underneath the support housing 2. The hollow beam forms a closed transmission housing which encapsulates the parts stored therein and which preferably also includes an oil bath.

For the circular spike harrow that is shown in the drawings, spikes or blades 3 are provided as soil working tools. One pair of these is always fastened to a common tool support 4. They jointly form a tool unit. For example, in the case of circular spike harrows with a 2.50 m working width, there are ten units of tool supports 4. The tool support 4 is solidly seated on the lower end of a driveshaft 6. The driveshaft 6 is rotatably mounted in the support housing 2 by means of the bearings 7, 8. In the example shown, it has a vertical rotation axle 9. A gear wheel transmission 10 rotationally drives the tool supports 4. It has one gear wheel 11 for each tool support 4. In the example shown, the gear wheels 11 directly engage one another, so that the tool supports 4 are forced into motion in alternating rotational directions.

The gear wheel 11 is rotatably mounted on a hub body 12 which is affixed on the driveshaft 6 in a non-rotating fashion. By means of a plain bearing bush 13 it can also move axially to a limited extent. It is coupled to the hub body through a catching device 14 which can be temporarily released against a spring pre-tension in case of overload.

The catching device 14 comprises a one-way, over-running clutch, through which the hub body 12 can be rotated within a given clearance angle 15 relative to its gear wheel 11, about the rotation axis 9, which is common to the two parts. This clearance angle 15 is 5° to 20° and preferably about 10°.

In the embodiment according to FIGS. 1 to 3, each gear wheel 11 can be moved on its hub body 12 axially against the action of two cup springs 16 from a lower catch position shown in FIG. 1 into an upper release position. The gear wheel 11 on its lower side has two diametrically disposed, annular, segmented catching cams 17, 18. These catching cams 17, 18, in turn, interact with annular, segmented catching pockets 19, 20 in the hub body 12. The central angle of the catching cams 17, 18 is smaller than the central angle of the catching pockets 19, 20, and the central angle difference corresponds to the clearance angle 15 of the one-way over-running clutch. The two respectively radially aligned boundary walls 21, 22 of the catching pockets 19, 20 are inclined upwards and outwards at an angle of 30° to 60° but preferably about 45°, as can especially be seen in FIG. 3. They face and are parallel to the two likewise radially aligned boundary walls 23, 24 of the catching cams 17, 18.

The catching cams 17, 18, in conjunction with their associated catching pockets 19, 20, in this fashion form a catching device 14 whose overload moment can be determined exactly and furthermore, can be adjusted by changing the pre-tension force of the springs 16. The boundary walls 21, 23 and 22, 24 respectively have relatively large contact surfaces, which are directed along a radial line. These are co-determined by the height of the catching cams 17, 18, which preferably amounts to about 4 mm and which incidentally is somewhat less than the depth of the catching pockets 19, 20.

Figure 5:
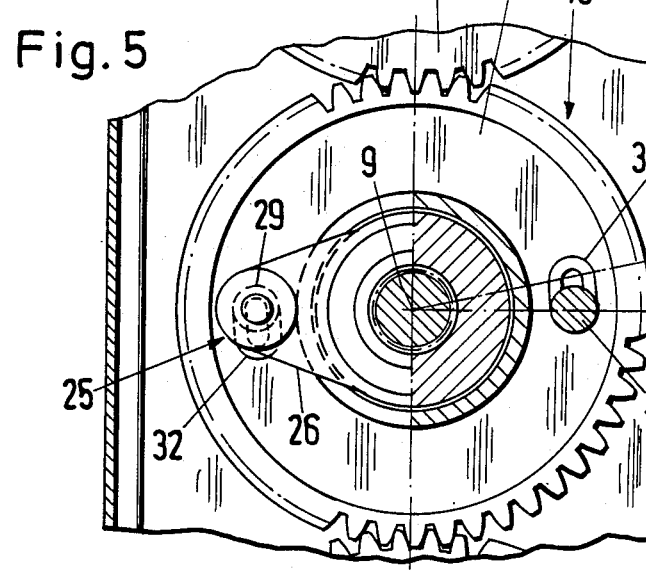
FIG. 5 is a sectional view taken along the line V—V in FIG. 4.

In the design of the soil working machine according to FIGS. 4 and 5, a catching device 25 is provided which differs in its structural design from the catching device 14 of FIGS. 1 to 3, but which in principle fulfills an analogous function and is likewise provided with an over-running clutch.

In contrast to the design of FIGS. 1 to 3, the gear wheel 11 in the design of FIGS. 4 and 5 can rotate only about the axis of rotation 9 but cannot move axially on the hub body 12. Thus, when an overload occurs, the gear wheels 11 remain in their operating position shown in FIG. 4. The hub body 12 has upper radial protrusions 26, 27, which overlap the gear wheel 11. These protrusions 26, 27 form the supports for two diametrically disposed catching pins 29, 30. The catching pins 29, 30 are supported in such a way that they can move against the pretension of helical pressure springs 28. The catching pins 29, 30 each have a cone-shaped gripping section. 31 at their lower end. The gear wheel 11 has two catching slots or pockets 32, 33, which run coaxial to the axis of rotation 9, are shaped like annular slots, and are likewise inclined conically at the upper edge. They extend in the circumferential direction over a central angle which corresponds to the clearance angle 15 of the over-running clutch.

The catching devices 14, 25, with their overrunning clutch, permit the tool supports 4 to execute rotational motions relative to the gear wheels 11. When there are collisions with stones, these relative rotational motions frequently suffice as escape motions to make it possible to pass by the stones without requiring the overload protection to respond by triggering the catching devices 14, 25. After the catching devices 14, 25 have been triggered, the coupling between the gear wheels 11 and the hub bodies 12 is re-established again after a 180° rotational motion. The over-running clutch guarantees that the coupling is a reliable process even at such high circumferential speeds as 3 m/s.

A monitoring device, the details of which are not shown, may be provided on the support housing 2. This monitoring device determines the catching or release positions of the catching devices 14, 25, for example, by sensing the height of the gear wheels 11 or the height of the catching pins 29, 30. The monitoring can be carried out and displayed electronically.

Power transmission during normal operation takes place by means of the engagement between the pairs of boundary walls 21, 23 or 22, 24, which contact one another depending on the direction of rotation. In normal operation, if a stone hits the leading edge (in the direction of rotation) of a blade 3 so that the stone exerts a torque on the tool support 4 against the direction of rotation of the drive of the tool support, there will be a release, provided that the overload capacity is exceeded. If, however, a stone hits the trailing edge (in the direction of rotation of the drive) of a blade 3, so that it exerts a torque acting in the direction of rotation of the drive of the tool support, then the tool support 4 and the hub body 12 which is connected to the tool support 4 can carry out a leading motion as a result of the clearance angle between the boundary walls of the cams and pockets which are at a distance from one another. As a consequence, the release process takes place only after such a over-running motion when the overload limit is exceeded. Due to the action of the blades of a neighboring working tool, those cases in which stones hit against the trailing edge of the blade while passing through the working area of the blades are surprisingly almost as frequent as the cases in which the leading edge of the blades come in contact with stones.

What I claim is:

1. In a cultivating machine having soil working tools comprising an elongated support housing extending generally perpendicular to the direction of movement of the cultivating machine, rotary support means in said housing, a driven shaft rotatably supported by said rotary support means, said shaft driving said soil working tools, a hub body mounted on said shaft to preclude relative rotational movement between said hub body and said shaft a gear wheel rotatably mounted on said hub body, and an over-running clutch means disposed between said hub body and said gear wheel, said clutch means comprising a spring means having a first extended driving position and a second extended release position, said spring means being extended a greater amount when in said first extended position than when in said second extended position, said clutch means being operable to provide a driving connection between said hub body and said gear wheel as said spring means is in said first extended position, said clutch means being operable during overload conditions to release said driving connection between said hub body and said gear wheel as said spring means is in said second extended position, said clutch means being operable to permit limited relative rotational movement between said gear wheel and said hub body over a clearance angle while said spring means is in said first extended position.

2. In a cultivating machine according to claim 1 wherein said clearance angle ranges from 5 degrees to 20 degrees.

3. In a cultivating machine according to claim 2 wherein said clearance angle is about 10 degrees 4. In a cultivating machine according to claim 2 wherein clutch means is formed by cams on said gear wheel and pockets on said hub body, said cams being received in said pockets, each of said cams and said pockets having a segmental, configuration having general radially disposed side walls which lie along spaced radial lines which subtend a central angle, the central angle of said pocket being greater than the central angle of said cam by an amount equal to said clearance angle.

5. In a cultivating machine according to claim 4 wherein said clutch means comprising two diametrically opposed cams on said gear wheel and two diametrically opposed pockets in said hub body.

6. In a cultivating machine according to claim 5 wherein said hub body has a cylindrical portion and a flange extending radially outwardly of said cylindrical portion, said pockets being formed in said flange.

7. In a cultivating machine according to claim 4 wherein said side walls of said pockets have a slope within the range of from 30 degrees to 60 degrees.

8. In a cultivating machine according to claim 7 wherein said slope is about 45 degrees.

9. In a cultivating machine according to claim 4 wherein said cams have a height of about 4 mm, said pockets having a depth greater than 4 mm.

10. In a cultivating machine according to claim 1 wherein said gear wheel is rotably mounted on said hub body, said gear wheel also being mounted to be axial movable relative to said hub body, said hub body having a cylindrical portion and a flange extending from said cylindrical portion, said flange having an annular face disposed in a plane perpendicular to the axis of said shaft, said gear wheel having an annular face disposed on a plane perpendicular to the axis of said shaft said flange face and said gear wheel face being disposed to face each other, said clutch means comprising projecting cams in one of said faces and indented pockets in the other of said faces.

11. In a cultivating machine according to claim 1 wherein said clutch means comprises two diametrically opposed pins mounted on said hub body, said pins having axes parallel to the axis of rotation of said shaft, said spring means biasing said pins in one axial direction, annular slots in said gear wheel, said annular slots each having two ends disposed along radial lines which subtend a central angle, said pins being engaged in said annular slots when said spring means is in said first extended position, said gear wheel being rotatable relative to said hub body over a first angle as said pins remain engaged in said annular slots and move from one end of said annular slot to the other end of said annular slot, said spring means being in said first extended position as said pins move from said one end to said other end of said annular slot, said first angle being equal to said clearance angle.

12. In a cultivating machine according to claim 11 wherein said pins have conical end portions receivable in said annular slots, said annular slots having sloping side walls corresponding to the cone angle of said conical end portions.

13. In a cultivating machine according to claim 11 wherein said hub body has projections which overlie said gear wheel and which support said pins.

14. In a cultivating machine according to claim 1 further comprising adjusting means for adjusting the pre-tension of said spring means.

15. In a cultivating machine according to claim 1 further comprising monitoring means on said support housing for providing a visual indication of said driving connection and the release of said driving connection during said overload conditions.

15. In a cultivating machine having soil working tools comprising an elongated support housing extending generally perpendicular to the direction of movement of the cultivating machine, rotary support means in said housing, a driven shaft rotatably supported by said rotary support means, said shaft driving said soil working tools, a hub body mounted on said shaft to preclude relative rotational movement between said hub body and said shaft a gear wheel rotatably mounted on said hub body, and an over-running clutch means disposed between said hub body, and said gear whelm said clutch means comprising a spring means having a first extending driving position and a second extending release position, said spring means being extended a greater amount when in said first extended position than when in said second extended position, said clutch means being operable to provide a driving connection between said hub body and said gear wheel as said spring means is in said first extending position, said clutch means being operable during overload conditions to release said driving connection between said hub body and said gear wheel as said spring means is in said second extended position, said clutch means comprising projections extending into slots which are larger than said projections such that said projections are movable in said slots to thereby permit limited relative rotational movement between said gear wheel and said hub body over a clearance angle while said spring means is in said first extended position.

16. In a cultivating machine having soil working tools comprising an elongated support housing extending generally perpendicular to the direction of movement of the cultivating machine, rotary support means in said housing, a driven shaft rotatably supported by said rotary means, said shaft driving said soil working tools, a hub body mounted on said shaft to preclude relative rotational movement between said hub body and said shaft, a gear wheel rotatably mounted on said hub body, and an over-running clutch means disposed between said hub body and said gear wheel, said clutch means comprising a spring means having a first extending driving position and a second extended release position, said spring means being extended a greater amount when in said first extended position than when in said second extended position, said clutch being operable to provide a driving connection between said hub body and said gear wheel as said spring means is in said first extended position, said clutch means being operable during overload conditions to release said driving connection between said hub body and said gear wheel as said spring means is in said second extended position, said clutch means comprising axial projections extending into arcuate slots which are larger than said projections such that said projections are movable in said arcuate slots without any axial displacement of said projections relative to said arcuate slots to thereby permit limited relative rotational movement between said gear wheel and said hub body over a clearance angle while said spring means is in said first extended position.

* * * * *